E. I. DRENT.
ELECTRIC LIGHT BRACKET.
APPLICATION FILED FEB. 20, 1909.
936,869.
Patented Oct. 12, 1909.
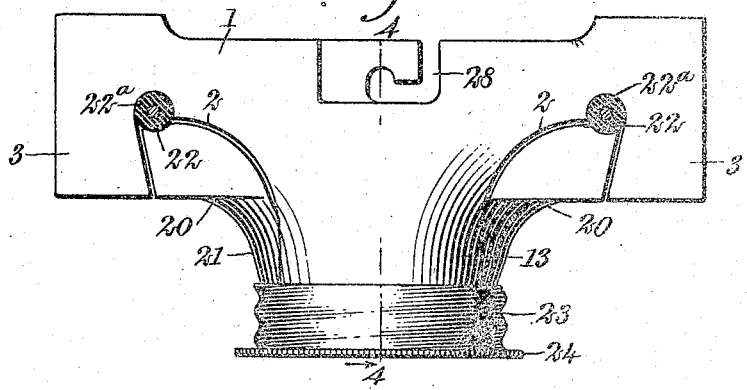
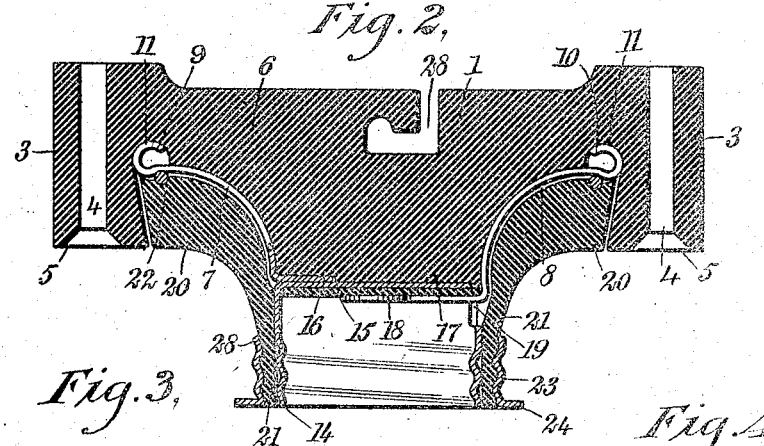
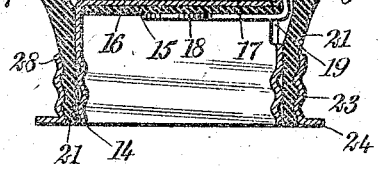
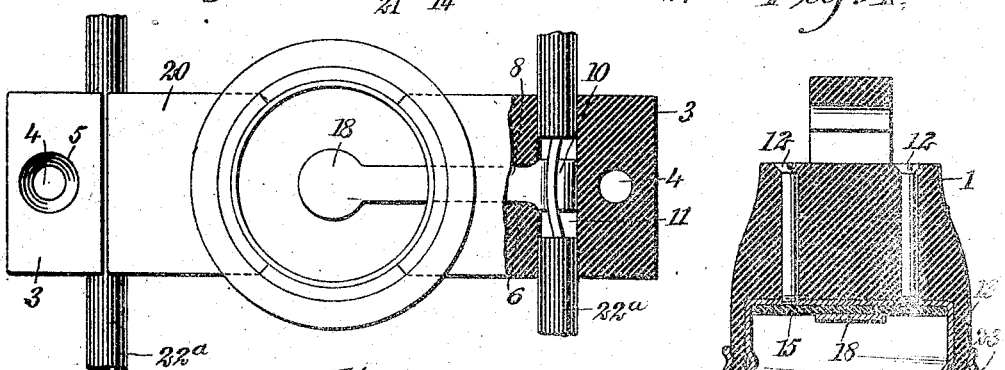
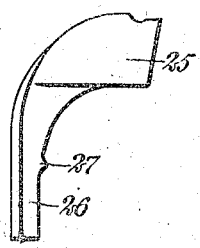
WITNESSES
Edward Thorpe
INVENTOR
Ernest I. Drent
BY Munn & Co.
ATTORNEYS

UNITED STATES PATENT OFFICE.

ERNEST IGNATIUS DRENT, OF NEW ORLEANS, LOUISIANA.

ELECTRIC-LIGHT BRACKET.

936,869.

Specification of Letters Patent. Patented Oct. 12, 1909.

Application filed February 20, 1909. Serial No. 479,024.

*To all whom it may concern:*

Be it known that I, ERNEST I. DRENT, a subject of the Czar of Russia, and a resident of New Orleans, in the parish of Orleans and State of Louisiana, have invented a new and Improved Electric-Light Bracket, of which the following is a full, clear, and exact description.

This invention relates to electric light brackets, and more particularly to a bracket which includes a body provided with a bulb-carrying socket, clamping jaws for removably securing the feed wires in place on the body, and a ring, the latter serving removably to engage the jaws to fasten the same firmly in place.

The object of the invention is to provide a device of the class described, simple and serviceable in construction and inexpensive to manufacture, which is so formed that it can be readily mounted for temporary use, or, if desired, can be permanently secured in place by means of screws or the like, the latter passing through portions of the body especially adapted for this purpose.

Reference is to be had to the accompanying drawings forming a part of this specification, in which similar characters of reference indicate corresponding parts in all the views.

Figure 1 is a side elevation showing an embodiment of my invention; Fig. 2 is a longitudinal section of the same; Fig. 3 is an inverted plan view of the same, parts being broken away and in section; Fig. 4 is a cross section on the line 4—4 of Fig. 1; and Fig. 5 is a side elevation of a modified form of clamping jaw.

Before proceeding to a more detailed description of my invention, it should be understood that I provide an electric light bracket, which, as before described, includes a body, clamping jaws adapted to secure the feed wires to the body, and a removable ring securing the jaws in place. For mounting my device temporarily, I have provided an opening in the body, which is substantially L-shaped in cross section, and which is adapted to receive a wire or other support, from which it is desired to hang the bracket. When, however, the device is to be mounted permanently upon a wall or ceiling, screws or the like can be employed, the latter passing through the body of the bracket, and thus serving to attach the device to the support.

In the specific form shown in the drawings, I provide a body member 1 of any suitable insulating material, such as porcelain, or the like, which has cut-away or recessed portions 2 for a purpose to be hereinafter described. The ends 3 of the body are provided with openings 4 having countersinks 5 adapted to receive screws for permanently mounting the device on a wall or ceiling. Located in grooves 6 in the cut-away portions 2, are contacts 7 and 8 respectively, both having the corresponding extremities 9 and 10, bent back upon themselves, as shown most clearly in Fig. 2 of the drawings. These bent portions of the contacts lie in transverse grooves 11 of the body, and constitute terminals.

Located on the body 1 and held in place between externally threaded extensions 13 of the same, is a threaded bulb socket 14 of any suitable material, such as brass or the like. The base of the socket receives a mica disk 15. It should here be mentioned that the extremity 16 of the contact 7 rests against the base 17 of the socket and is in electrical connection therewith, while the extremity 18 of the contact 8 is slightly enlarged, and enters within the socket at the side of the mica plate remote from the extremity 16, through an opening 19. Screws 12 extend through the body and engage the base of the socket, as shown most clearly in Fig. 4 of the drawings.

I have further provided clamping jaws 20, which are suitably formed to be received in the cut-away portion of the body 1, and which are provided with extensions 21, the latter being externally threaded. Each clamping jaw is provided with a groove 22, which, as shown most clearly in Fig. 1 of the drawings, serves to receive a feed wire 22ª so that when the jaws are firmly clamped in place, the feed wires will be forced into engagement with the extremities 9 and 10 respectively of the contacts, the resiliency of these extremities serving to effect a perfect contact.

I further provide an internally threaded ring 23 having a corrugated body and a rim 24. The ring, when the clamping jaws are in place, serves to receive the latter, as well as the extensions 13 of the body member, to lock the former firmly in place. Inasmuch as the upper portions of the clamping jaws are slightly tapered, the farther this ring is screwed down, the tighter will these jaws be secured in place.

Located at the back of the bracket, is an opening 28 preferably L-shaped in cross section, which serves to receive a wire or other support for temporarily mounting the bracket.

In the modified form shown in Fig. 5, I have provided a clamping jaw 25 having an extension 26, the latter being provided with a projection 27. When this form of jaw is used in connection with the bracket, the lower edge 28 of the ring serves to engage the projection 27 and thus clamp the jaw firmly in place.

It should be understood that I do not limit myself to the particular construction shown in the drawings, as others equally advantageous may be employed without departing from the spirit or the scope of the invention.

Having thus described my invention, I claim as new and desire to secure by Letters Patent:

1. In a device of the class described, a body having spaced extensions, a bulb socket mounted between said extensions, contacts carried by said body, one of said contacts being electrically connected with said socket, the other of said contacts projecting into said socket and being insulated therefrom, clamping jaws for holding feed wires in engagement with said contacts, and a common holding member encompassing said jaws and said extensions.

2. In a device of the class described, a body having spaced extensions, a bulb socket mounted between said extensions, contacts carried by said body and each having one extremity bent back upon itself to constitute a resilient terminal, clamping jaws for holding feed wires in engagement with said terminals, and a common holding member encompassing said jaws and said extensions.

3. In a device of the class described, a body having spaced extensions, a socket carried by said body, a mica disk arranged within said socket, contacts located on said body, the end of one of said contacts being in engagement with said socket and the end of the other of said contacts resting on said mica disk, jaws for removably holding feed wires in engagement with said contacts, and a common holding member encompassing said jaws and said extensions and serving to clamp the former rigidly in place.

4. In a device of the class described, a body having spaced extensions, a bulb socket mounted between said extensions, contacts carried by said body, jaws having threaded extensions and adapted to hold feed wires in engagement with said contacts, and an internally threaded ring encompassing said jaw extensions and said body extensions.

5. A device of the class described comprising a body member having near each end a recess, each recess having a groove in its bottom, a contact in each groove, said body having transverse grooves into which the outer ends of the contacts extend, said body having at opposite sides and between the recesses threaded extensions, a socket received between the extensions, clamping jaws between the extensions and engaging the contacts, and a ring threaded onto the extensions for securing the parts in place.

6. A device of the class described comprising a body member having near each end a recess, a contact in each recess, said body member having threaded extensions upon each side and between the recesses, a socket received between the extensions, clamping members within the recesses, and a ring threaded on to the extensions and engaging the clamping members for securing the parts in place.

In testimony whereof I have signed my name to this specification in the presence of two subscribing witnesses.

ERNEST IGNATIUS DRENT.

Witnesses:
EDWARD HOLT,
J. R. LE GALLEZ.